United States Patent Office 3,450,222
Patented June 17, 1969

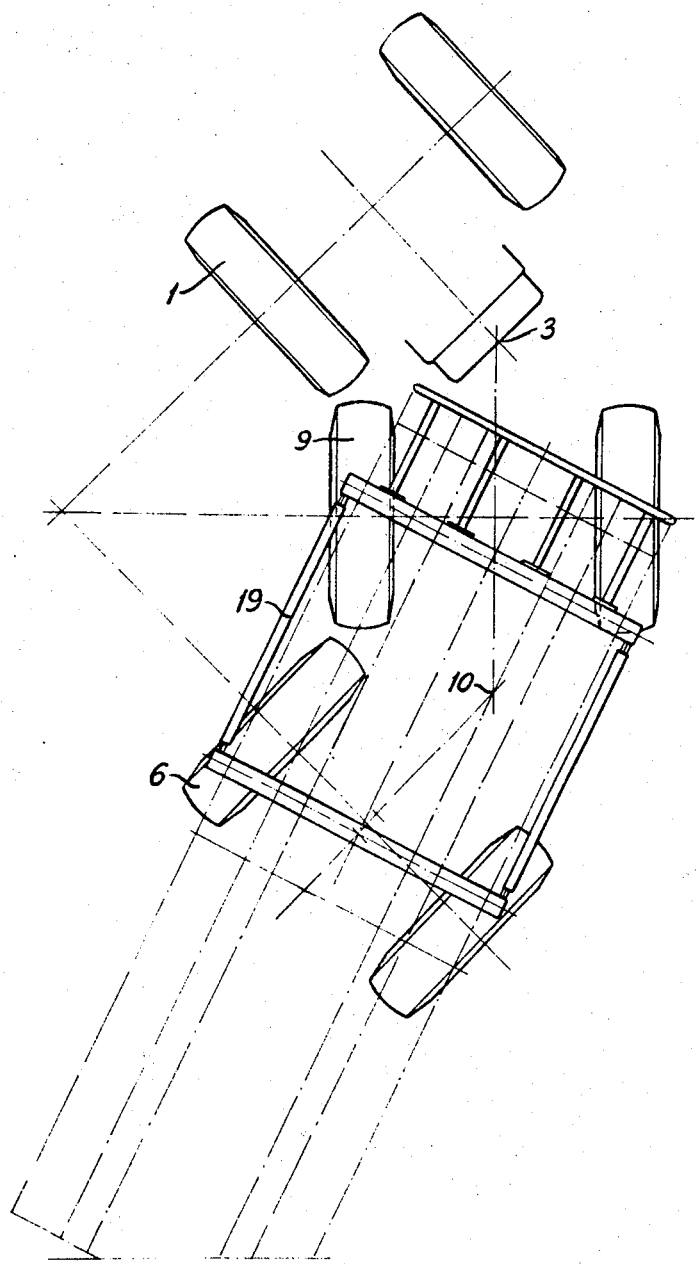

3,450,222
SELF-PROPELLED VEHICLE HAVING THREE-WHEELED SECTIONS
Stig Mattis Lennart Ohlson, Vintrie, Sweden, assignor to Kockums Mekaniska Verkstads Aktiebolag, Malmo, Sweden
Filed Sept. 12, 1966, Ser. No. 578,789
Claims priority, application Sweden, Sept. 20, 1965, 12,170/65
Int. Cl. B62d 61/10
U.S. Cl. 180—23                3 Claims

ABSTRACT OF THE DISCLOSURE

A self-propelled vehicle having front and rear sections with a fixed wheel set on each. A first hinge means substantially midway between the sections is provided for steering the vehicle. A further section having a fixed wheel set and a second hinge means is located between such further section and an adjacent section connecting said further section to such adjacent section.

---

The present invention relates to an arrangement in self-propelled vehicles having front and rear sections and hinge means therebetween for steering the vehicle. Owing to their excellent maneuverability, self-propelled vehicles of this type have found extensive use in timber cutting operations for conveying felled trees from stump to loading area.

The vehicle of the present invention is characterized in that it has, in addition to the front and rear sections, a further section which is connected by means of a further hinge to the rear section so as to swing in relation to this section and the rest of the vehicle.

The invention will now be described in detail with reference to the accompanying drawings illustrating a preferred embodiment. In the drawings:

FIG. 4 illustrates schematically the maneuverability of the vehicle equipped with the arrangement of the invention.

Figure 1:
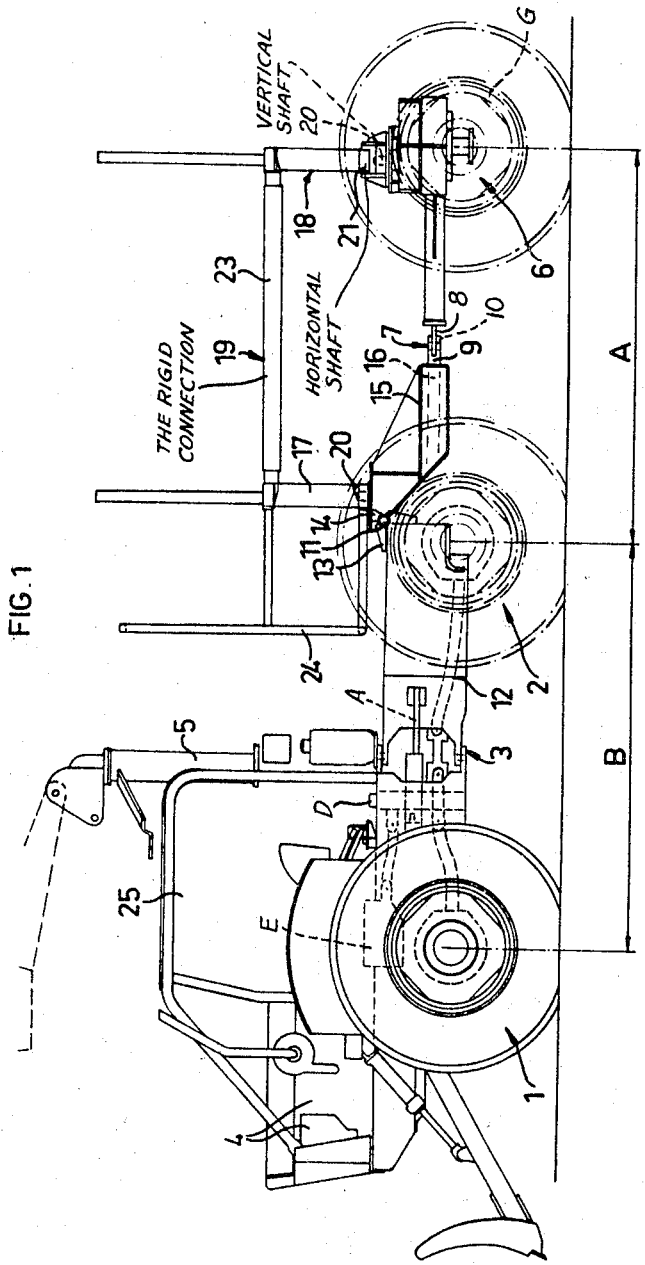
FIG. 1 is a side elevational view of a self-propelled vehicle equipped with the arrangement of the invention.

The self-propelled vehicle of the present invention has a front section 1 and a rear section 2 and hinge means 3 about which the two sections 1, 2 swing relative to one another and are steered by means (not shown in detail) connected to the front section 1 and the rear section 2 and consisting, as a rule, of a double-acting piston-cylinder device. For its propulsion, the vehicle is equipped with an engine 4 and a swinging crane 5 and also has means for steering the vehicle which, however, do not constitute the subject matter of this invention and therefore are not described in detail.

According to the invention the self-propelled vehicle has, in addition to the front and rear sections 1 and 2, a further section 6 which is connected by further hinge means 7 to the rear section 2 so as to swing in relation thereto and the rest of the vehicle. In this instance, the hinge means 7 simply is a tongue 8 extending in between the limbs of a fork 9 and connected to these limbs by a vertically extending shaft 10. The distance A between the further section 6 and the rear section 2 is the same as the distance B between the front section 1 and the rear section 2. The further section 6 and its hinge means 7 are pivotally and vertically connected to the rear section 2. To this end, the vehicle has a transversely extending shaft 11 provided in or adjacent a vertical principal plane through the rear section 2. Bearing means 13 for the shaft 11 are provided in the rear part of the undercarriage 12 of the rear section 2, and the shaft 11 extends through bearing means 14 in the undercarriage 15 of the further section 6. The shaft 11 preferably consists of removable pins provided in the bearings 13, 14, one pin for each bearing pair 13, 14.

The undercarriage 15 of the further section 6 has between the hinge means 7 and the shaft 11 extending transversely of the vehicle a horizontal shaft 16 extending in and parallel to the central principal plane of the vehicle.

Figure 2:
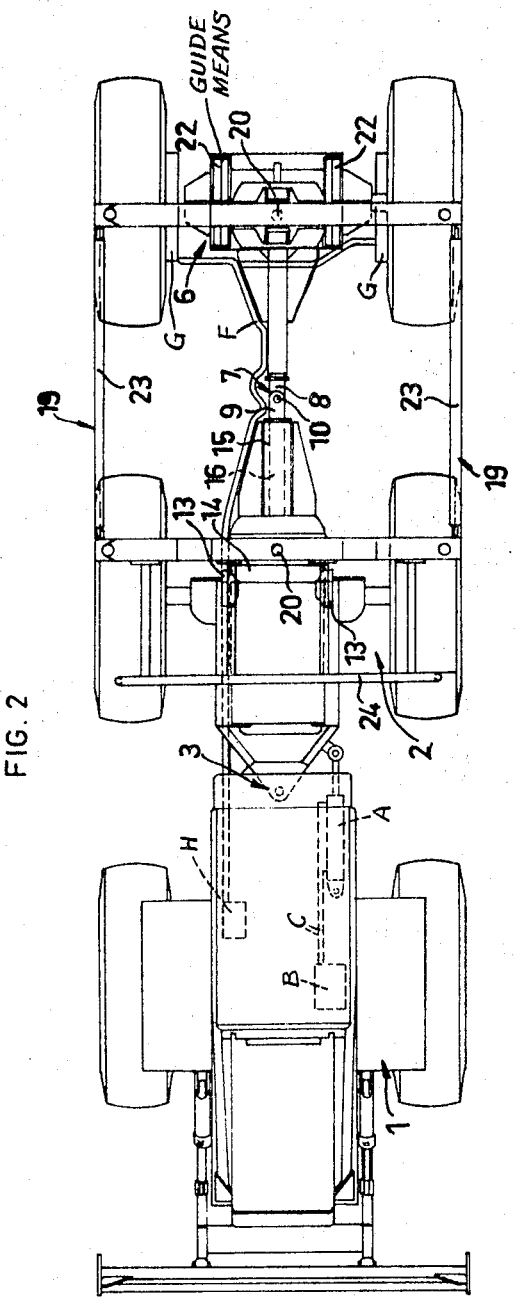
FIG. 2 is a top plan view of the vehicle.
Figure 3:
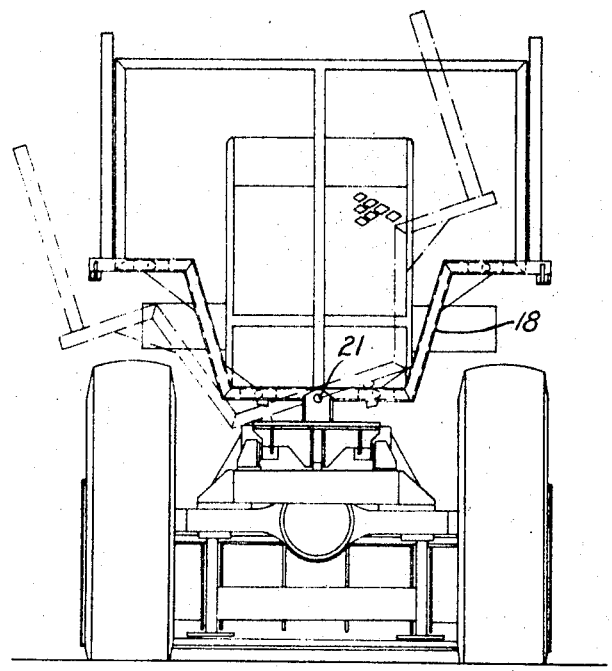
FIG. 3 is a rear view of the vehicle.

The hinge means 3 is shown in FIGURE 1 and has been elucidated in FIGURE 2. It consists of a fulcrum to which the front section 1 and the rear section 2 are hinged and which thus pivotally interconnects said front and rear sections. In FIGURES 1 and 2 a hydraulic power unit A is connected to a hydraulic power source B via conduits C, and with the aid of said unit A the front and rear sections can be swung in relation to one another about the hinge means 3. In FIGURE 1 the transmission D transmits power from the engine 4 via a gearbox E to the wheels of the sections 1 and 2.

The rigid connection 19 involves that in all prevailing relative positions of the rear section 2 and the further section 6 the load support means 17 and 18 always constitute a rigid unit for supporting load. If the further section 6 pivots in relation to the rear section about the horizontal shaft 16 the load support means 18 of the further section 6 tilts about the horizontal shaft 21 and retains its original position with respect to the load support means 17 of the rear section 2. The same unchanged relative position is occupied by the load support means 17 and 18 if the further section 16 swings about the shaft 10 with respect to the rear section 2. In this case the load support means swing about the vertical shafts 20. These fixed relative positions of the load support means, for very comprehensive reasons, are of great importance for a safe transportation of logs over such ground where the wheel pairs constantly change position both horizontally and vertically.

In FIG. 2 the lines F are for leading hydraulic medium to hydraulic motors G for driving the wheels of the further section 6. The lines F are connected to a hydraulic pump H driven by the engine 4.

Self-propelled vehicles of the type referred to in the present invention are intended primarily for the transport of logs and are provided with front and rear load support means 17 and 18. According to the present invention, these load support means are provided on the further section 6 on either side of the hinge means 7 thereof and are coupled together by means of a rigid connection 19. Moreover, both load support means 17, 18 are rotatable about vertical shafts 20, the rear load support means 18 being hingedly connected to a horizontal shaft 21 extending longitudinally of the vehicle. Instead of being provided on the further section 6, between this section and the load support means 18, the shaft 21 and the hinge constituted thereby can be provided between said further section 6 and the load support means 17. The shaft 21 and the hinge constituted thereby may also be provided in both load support means 17, 18 simultaneously, and in that case a manually operated, semiautomatic or automatic device is provided for maintaining the load support means in vertical position when carrying large loads over difficult terrain. This device may consist of one or more hydraulic cylinders regulating the angular deflection of the load support means. The hydraulic cylinder motion is controlled by a valve which is actuated either manually or by rotation of the shaft 16 or by gyro means. In addition, one of the load support means 17, 18, preferably the rear support means 18, can be displaceably mounted in the longitudinal direction of the vehicle in relation to the further section 6 which for this purpose is provided with guides 22 in which the load support means 18 is mounted for displacement longitudinally of the vehicle. The rigid connection 19 comprises rods 23 detachably connected at their ends to the load support means 17 and 18. The rigid connection 19 maintains a constant distance between the load support means 17 and 18, and the guide assembly 22 permits the disalignment of the further section 6 resulting from the swinging movement of this section about the hinge means 7. The forward load support means 17 is provided with a protective screen 24 preventing logs carried by the vehicle from getting too close to the front section 1 and the cabin 25 thereof. To adapt the vehicle to different log lengths, the rods 23 constituting the connection 19 can be replaced by longer rods to the extent permitted by the displacement of the shaft 16 in the undercarriage 15.

To further improve the self-propelled vehicle, also the wheels of the further section 6 can be designed as driving wheels, and to this end a transmission (not shown) can be connected to the vehicle engine 4.

As will appear especially from FIG. 4, the self-propelled vehicle, including said further section 6, has, in spite of its length a narrow turning radius, and at all steering angles the wheels of the vehicle will run in each other's tracks. In addition, the load carried by the load support means 17 and 18 will smoothly follow the complicated movements of the vehicle over difficult terrain. By the arrangement of the invention, the usefulness of the self-propelled vehicle has been extended to cover not only log transports but also a variety of other transport goods in all conceivable shapes etc., while still maintaining its easy maneuverability. Naturally, each section need not be carried by a single axle only; one or more of the vehicle sections can be mounted on pivot trucks.

The term "fixed wheel set" implies a wheel set, that is a supporting and mounting means for the vehicle section or unit. The steering of the vehicle thus is not performed by pivoting the wheel set of some of the vehicle sections or units in relation to the section or unit in question but by pivoting the sections in relation to each other about hinge means located substantially midway between the sections. By this arrangement the wheels of the sections will run in the same tracks also in narrow curves and it is therefore possible to effect narrow turns about growing trees also when the vehicle is loaded. This is of the utmost importance for the haulage of logs in forests.

What I claim and desire to secure by Letters Patent is:

1. A vehicle for log transports provided with front and rear load support means comprising a front and a rear section, a fixed wheel set on each of said sections, a first hinge means substantially midway between said sections for steering the vehicle, a further section having a fixed wheel set, an adjacent section connecting said further section to said rear section, a second hinge means located between said further section and said adjacent section, said load support means being provided on said further section on either side of said second hinge means thereof and coupled together by a rigid connection, said load support means both being rotatable about vertical shafts, and one of said rear and front load support means being pivotal about a horizontal shaft extending longitudinally of the vehicle.

2. A vehicle as claimed in claim 1 wherein said load support means are both pivotal about horizontal shafts extending longitudinally of the vehicle with means provided to control the angular position of said load support means in relation to the vehicle.

3. A vehicle as claimed in a claim 1 wherein one of said load support means is displaceably mounted longitudinally of the vehicle in relation to said further section.

References Cited

UNITED STATES PATENTS

| | | | |
|---|---|---|---|
| 2,426,652 | 9/1947 | Storey | 180—50 |
| 3,225,850 | 12/1965 | Simmons et al. | 180—14 |
| 1,305,228 | 5/1919 | Maxwell | 180—14 |
| 1,884,975 | 10/1932 | John | 280—404 |
| 2,595,594 | 5/1952 | Martin | 180—50 |
| 2,937,886 | 5/1960 | Poole | 280—492 |
| 3,027,959 | 4/1962 | Mailliard | 280—404 |
| 3,070,386 | 12/1962 | Gregg | 280—404 |
| 3,172,685 | 3/1965 | Mandekic | 280—408 |
| 3,191,709 | 6/1965 | Symons | 180—51 |
| 3,227,235 | 1/1966 | Budzich et al. | 180—14 |
| 3,246,714 | 4/1966 | Middlesworth et al. | 180—14 |

KENNETH H. BETTS, *Primary Examiner.*

U.S. Cl. X.R.

180—14, 50, 51; 280—404, 423